United States Patent
Kwon

(10) Patent No.: US 8,212,607 B2
(45) Date of Patent: Jul. 3, 2012

(54) INTERNAL VOLTAGE GENERATOR AND METHOD OF GENERATING INTERNAL VOLTAGE

(75) Inventor: Lee Hyun Kwon, Ichon-shi (KR)

(73) Assignee: SK Hynix Inc., Gyeonggi-do (KR)

( * ) Notice: Subject to any disclaimer, the term of this patent is extended or adjusted under 35 U.S.C. 154(b) by 168 days.

(21) Appl. No.: 12/838,352

(22) Filed: Jul. 16, 2010

(65) Prior Publication Data

US 2011/0156805 A1 Jun. 30, 2011

(30) Foreign Application Priority Data

Dec. 29, 2009 (KR) .................. 10-2009-0132766

(51) Int. Cl.
G05F 1/10 (2006.01)
G05F 3/02 (2006.01)

(52) U.S. Cl. .................................... 327/536
(58) Field of Classification Search .............. 327/536; 363/59–60

See application file for complete search history.

(56) References Cited

U.S. PATENT DOCUMENTS

| | | | |
|---|---|---|---|
| 6,347,058 B1 | 2/2002 | Houghton et al. | |
| 6,373,753 B1 | 4/2002 | Proebsting | |
| 6,853,567 B2 | 2/2005 | Kwon | |
| 6,853,593 B1 | 2/2005 | Bae | |
| 7,020,043 B1 | 3/2006 | Lee | |
| 2004/0239409 A1 | 12/2004 | Jang et al. | |
| 2005/0243624 A1 | 11/2005 | Jang | |
| 2006/0097804 A1 | 5/2006 | Im et al. | |
| 2006/0104138 A1* | 5/2006 | Kim | 365/222 |
| 2007/0236278 A1* | 10/2007 | Hur et al. | 327/536 |

FOREIGN PATENT DOCUMENTS

| | | |
|---|---|---|
| JP | 2003-030985 | 1/2003 |
| JP | 2005-318034 | 11/2005 |
| KR | 1019960025746 A | 7/1996 |
| KR | 10-2005-0011974 A | 1/2005 |
| KR | 10-2006-0022161 A | 3/2006 |
| KR | 100776760 B1 | 11/2007 |

* cited by examiner

*Primary Examiner* — Quan Tra
(74) *Attorney, Agent, or Firm* — William Park & Associates Ltd.

(57) ABSTRACT

An internal voltage generator and a method of generating an internal voltage are disclosed. The internal voltage generator includes: a charge pumping block configured to perform charge pumping base on a period pulse signal to generate an internal voltage, and output the generated internal voltage to an interval voltage terminal; a voltage detection block configured to detect the voltage level of the internal voltage terminal; a driving voltage supply block configured to supply a first power supply voltage or a second power supply voltage having a higher voltage level than the first power supply voltage as a driving voltage, depending on the detection result of the voltage detection block; and a period pulse generation block configured to drive the period pulse signal to the is driving voltage supplied from the driving voltage supply block. The period pulse signal driven by the second power supply voltage has a longer pulsing period than the period pulse signal driven by the first power supply voltage.

13 Claims, 4 Drawing Sheets

INTERNAL VOLTAGE GENERATOR AND METHOD OF GENERATING INTERNAL VOLTAGE

CROSS-REFERENCE TO RELATED APPLICATION

The present application claims priority under 35 U.S.C. §119(a) to Korean Application No. 10-2009-0132766, filed on Dec. 29, 2009, in the Korean Intellectual Property Office, which may be incorporated herein by reference in its entirety as if set forth in full.

BACKGROUND

1. Technical Field

Various exemplary aspects of the present invention is generally relate to a semiconductor apparatuses and related methods. In particular, certain exemplary aspects relate to a technology for generating an internal voltage in a semiconductor apparatus.

2. Related Art

A semiconductor apparatus generally includes an internal voltage generator which generates an internal voltage using an outside power supply voltage. This method reduces power consumption and increases power efficiency. When the power is destabilized and the power supply voltage increases, the level of the internal voltage generated by the internal voltage generator increases. After the power supply voltage reaches a target voltage level, the internal voltage remains constant. Even when the power supply voltage surpass the target voltage level, the internal voltage remains constant.

Meanwhile, when the internal voltage generator generates an internal voltage higher than that of the power supply voltage, it may perform an operation such as charge pumping to generate an internal voltage, or a boosting voltage. Since a large amount of current may be consumed to generate a boosting voltage higher than that of a power supply voltage, a technology for reducing current consumption may be required.

SUMMARY

Accordingly, various exemplary aspects of the invention may provide semiconductor apparatuses and/or methods that may is improve the economic efficiency and thereby price competitiveness of a semiconductor apparatus. In one exemplary aspect of the present invention, an internal voltage generator includes: a charge pumping block configured to perform charge pumping base on a period pulse signal to generate an internal voltage, and output the generated internal voltage to an interval voltage terminal; a voltage detection block configured to detect the voltage level of the internal voltage terminal; a driving voltage supply block configured to supply a first power supply voltage or a second power supply voltage having a higher voltage level than the first power supply voltage as a driving voltage, depending on the detection result of the voltage detection block; and a period pulse generation block configured to drive the period pulse signal to the driving voltage supplied from the driving voltage supply block. The period pulse signal driven by the second power supply voltage has a longer pulsing period than the period pulse signal driven by the first power supply voltage.

In another exemplary aspect of the present invention, a method of generating an internal voltage by performing charge pumping base on a period pulse signal is provided. The method includes: performing charge pumping base on the period pulse signal which is driven by a first power supply voltage and a ground voltage during a first interval in which the voltage level of an internal voltage terminal increases to a predetermined voltage level; and performing charge pumping base on the period pulse signal which is driven by a second power supply voltage having a higher level than the first is power supply voltage and the ground voltage during a second interval in which the voltage level of the internal voltage terminal increases to a target voltage level from the predetermined voltage level and is then maintained to the target voltage level. The period pulse signal driven by the second power supply voltage and the ground voltage has a longer pulsing period than the period pulse signal driven by the first power supply voltage and the ground voltage.

In another exemplary aspect of the present invention, an internal voltage generator includes: a charge pumping block configured to perform charge pumping base on a period pulse signal to generate an internal voltage, and output the generated internal voltage to an internal voltage terminal; a period pulse generation block configured to drive the period pulse signal in response to a clock output enable signal; a driving voltage supply block configured to supply a first power supply voltage as a driving voltage to the period pulse generation block during an activation interval of a first interval signal, and supply a second power supply voltage as a driving voltage to the period pulse generation block during an activation interval of a second interval signal, the second power supply voltage having a higher voltage level than the first power supply voltage; a voltage detection block configured to activate and output the clock output enable signal when the voltage level of the internal voltage terminal is lower than a target voltage level; and an interval signal generation block configured to activate and output the first interval signal during a first interval in which the voltage level of the internal voltage terminal increases to the target voltage level, and activate and output the second interval signal during a second interval in which the voltage level of the internal voltage terminal is maintained to the target voltage level, after the first interval.

BRIEF DESCRIPTION OF THE DRAWINGS

Reference will now be made in detail to the exemplary embodiments consistent with the present disclosure, examples of which are illustrated in the accompanying drawings. Wherever possible, the same reference characters will be used throughout the drawings to refer to the same or like parts.

DETAILED DESCRIPTION

Figure 1:
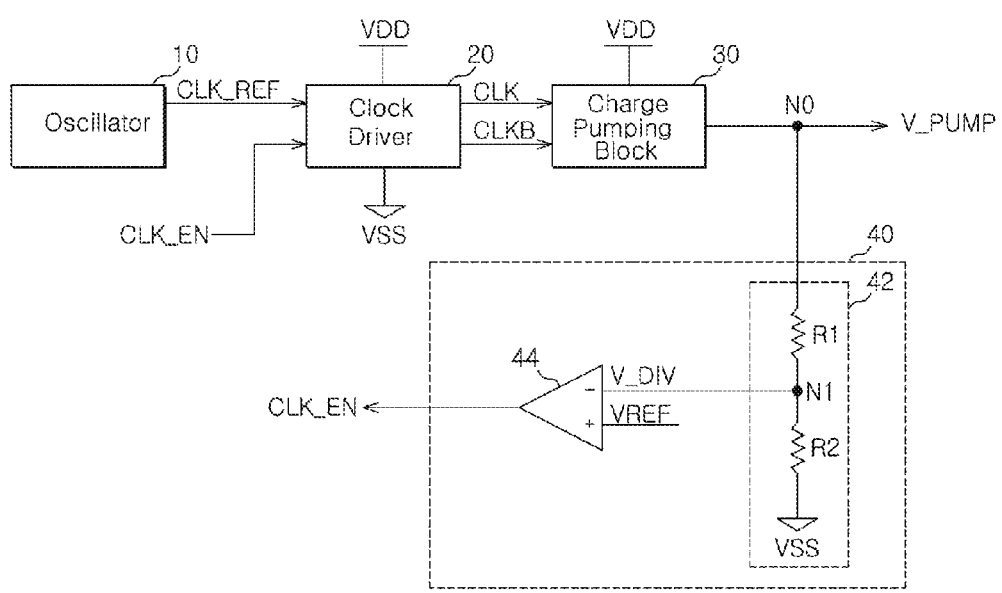
FIG. 1 is a configuration diagram of an internal voltage generator according to a first exemplary aspect.

Reference will now be made in detail to the exemplary aspects consistent with the present disclosure, examples of which are illustrated in the accompanying drawings. Wherever possible, the same reference characters will be used throughout the drawings to refer to the same or like parts.

FIG. 1 schematically illustrates an internal voltage generator consistent with the embodiments of the present invention.

In FIG. 1, the internal voltage generator includes an oscillator 10, a clock driver 20, a charge pumping block 30, and a voltage detection block 40.

The oscillator 10 is configured to generate a clock signal CLK_REF, which has a predetermined period.

When a clock output enable signal CLK_EN and clock signal CLK_REF are activated, the clock driver 20 drives period pulse signals CLK and CLKB using a power supply voltage VDD and a ground voltage VSS as driving voltages. In this embodiment, the period pulse signals CLK and CLKB are differential clock signals.

The period pulse signals CLK and CLKB control the charge pumping block 30 which may generate an internal voltage V_PUMP, and output the generated internal voltage V_PUMP to an internal voltage terminal N0. The charge pumping block 30 generates the internal voltage V_PUMP using the power supply voltage VDD. The voltage level of the generated internal voltage V_PUMP may be higher than that of the power supply voltage VDD.

The voltage detection block 40 is configured to detect whether or not the voltage level of the internal voltage terminal N0 reaches a target voltage level, and outputs a clock output enable signal CLK_EN. The voltage detection block 40 includes a voltage division unit 42 and a voltage comparison unit 44. The voltage division unit 42 is configured to divide the voltage of the internal voltage terminal N0. The voltage division unit 42 includes a plurality of voltage drop elements R1 and R2 connected between the internal voltage terminal N0 and the ground voltage terminal VSS. The voltage drop elements R1 and R2 are divided to create the voltage V_DIV. The comparison unit 44 then compares the divided voltage V_DIV with a reference voltage VREF and outputs clock output enable signal CLK_EN. If the divided voltage V_DIV is lower than the reference voltage VREF, the comparison unit 44 activates the clock output enable signal CLK_EN.

According to the embodiment, the internal voltage generator performs charge pumping until the voltage level of the internal voltage terminal N0 reaches the target voltage level. The voltage detection block 40 accordingly deactivates the clock output enable signal CLK_EN when the internal voltage terminal N0 reaches the target voltage level. Consequently, the clock driver 20 stops driving the period pulse signals CLK and CLKB, and the charge pumping block 30 stops charge pumping. When the voltage level of the internal voltage terminal N0 decreases to less than the target voltage level, the voltage detection unit 40 detects this to activate the clock output enable signal CLK_EN. Then, the clock driver 20 is drives the period pulse signals CLK and CLKB, and the charge pumping block 30 performs charge pumping based on the period pulse signals CLK and CLKB such that the voltage level of the internal voltage terminal N0 increases again.

Figure 2:
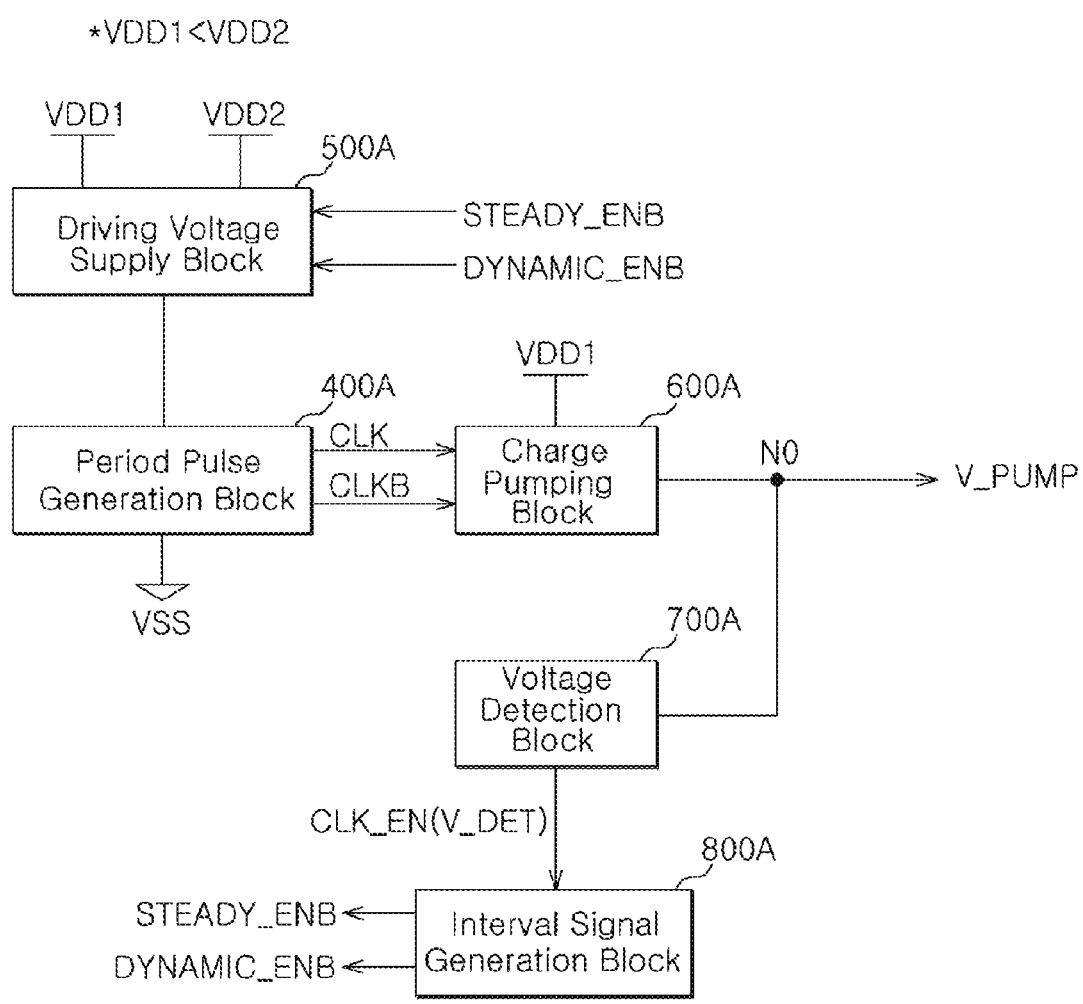
FIG. 2 is a configuration diagram of an internal voltage generator according to a second exemplary aspect.

FIG. 2 is a diagram of an internal voltage generator configuration according to a second embodiment.

In FIG. 2, the internal voltage generator includes a charge pumping block 600A, a voltage detection block 700A, a driving voltage supply block 500A, a period pulse generation block 400A, and an interval signal generation block 800A.

The detailed configuration and operation of the internal voltage generator will be described below.

The charge pumping block 600A is configured to perform charge pumping base on period pulse signals CLK and CLKB to generate an internal voltage V_PUMP, and output the generate internal voltage V_PUMP to an internal voltage terminal N0. The charge pumping block 600A generates the internal voltage V_PUMP using a power supply voltage VDD1, and the voltage level of the generated internal voltage V_PUMP is higher than that of the power supply voltage VDD1.

The voltage detection block 700A is configured to detect whether or not the voltage level of the internal voltage terminal N0 reaches a predetermined level, and output a voltage detection signal V_DET. The predetermined level may be lower than the target voltage level of the internal voltage terminal N0, that is, a target voltage level of the internal voltage V_PUMP. Although not shown in FIG. 2, the voltage detection block 700A may include a voltage division unit and a comparison unit. The voltage division unit divides the voltage of the internal voltage terminal N0. The voltage division unit includes a plurality of voltage drop elements connected between the internal voltage terminal N0 and a ground voltage terminal VSS. These voltage drop elements are divided to output the voltage V_DIV. The comparison unit compares the divided voltage V_DIV with a reference voltage generated by a band gap reference circuit, and outputs a voltage detection signal V_DET corresponding to the comparison result. Therefore, the reference voltage may be constant, regardless of a temperature change.

The driving voltage supply block 500A is configured to supply a first power supply voltage VDD1 or a second power supply voltage VDD2 having a higher voltage level than the first power supply voltage VDD1, depending on the detection result of the voltage detection block 700A. In this embodiment, the first interval signal DYNAMIC_ENB and a second interval signal STEADY_ENB control the driving voltage supply block 500A to supply either the first power supply voltage VDD1 or the second power supply voltage VDD2, respectively. The interval signals are outputted from an interval signal generation block 800A. For example, when first interval signal DYNAMIC_ENB is activated, the driving voltage supply block 500A supplies the first power supply voltage VDD1. Likewise, the activation of the second interval signal STEADY_ENB supplies the is second power supply voltage VDD2. Therefore, the voltage detection block 700A outputs the voltage detection signal V_DET, which, in turn, controls the interval signal generation block 800A to generate the first interval signal DYNAMIC_ENB or the second interval signal STEADY_ENB. In other words, when the voltage detection signal V_DET is activated, the first interval signal DYNAMIC_ENB may be activated and outputted. When the voltage detection signal V_DET is deactivated, the second interval signal STEADY_ENB may be activated and outputted. In conclusion, the driving voltage supplied by the driving voltage supply block 500A is dependent on the detection result of the voltage detection block 700A. Therefore, the internal voltage generator is controlled by the voltage detection block 700A without using the interval signal generation block 800A. A detailed example of the interval signal generation block 800A in another embodiment will be described below.

The period pulse generation block 400A is configured to drive period pulse signals CLK and CLKB using the driving voltage supplied from the driving voltage supply unit 500A. That is, the period pulse generation block 400A drives the period pulse signals CLK and CLKB using the first power supply voltage VDD1 or the second power supply voltage VDD2 having a higher voltage level than the first power supply voltage VDD1 as the driving voltage. At this time, the period pulse signals CLK and CLKB driven by the second power supply voltage VDD2 and the ground voltage VSS have a longer pulsing period than the period pulse signals CLK and CLKB is driven by the first driving voltage VDD1 and the ground voltage VSS. That is, although the period pulse signals CLK and CLKB driven by the second power supply voltage VDD2 have a longer pulsing period than the period pulse signals CLK and CLKB driven by the first power supply voltage VDD1, the pulsing time of the period pulse signals CLK and CLKB driven by the second power supply voltage VDD2 is earlier than that of the period pulse signals CLK and CLKB driven by the first power supply voltage VDD1, because the second power supply voltage VDD2 has a higher voltage level than the first power supply voltage VDD1. In this embodiment, the period pulse signals CLK and CLKB are differential clock signals.

According to the second embodiment, the internal voltage generator increases the voltage of the internal voltage terminal N0 until the voltage level of the internal voltage terminal N0 reaches a target level during charge pumping. Such an operation will be described below in more detail.

Before the charge pumping of the charge pumping block 600A may be performed, internal voltage terminal N0 maintains a voltage equivalent to the level of the ground voltage VSS. The voltage detection block 700A activates and outputs a voltage detection signal V_DET until the voltage level of the internal voltage terminal N0 reaches a predetermined voltage level. When the voltage detection signal V_DET is activated, the period pulse generation block 400A drives the period pulse signals CLK and CLKB using the first power supply voltage VDD1 and the ground voltage VSS. The period pulse signals CLK and CLKB control the charge pumping block 600A as it increases the voltage level of the internal voltage terminal N0.

After the voltage level of the internal voltage terminal N0 reaches the predetermined voltage level, the voltage detection block 700A deactivates and outputs the voltage detection signal V_DET. In this case, the predetermined voltage level may be slightly lower than the target level of the internal voltage terminal N0. However, it may be set to a level at which the voltage level of the internal voltage terminal N0 has already increased sufficiently so that the charge pumping starts to be performed limitedly. The period pulse generation block 400A then drives the period pulse signals CLK and CLKB using the ground voltage VSS and the second power supply voltage VDD2, which has a higher voltage than the first power supply voltage VDD1. Since the period pulse signals CLK and CLKB driven by the second power supply voltage VDD2 have a longer pulsing period than the period pulse signals CLK and CLKB driven by the first power supply voltage VDD1, the number of charge pumping operations of the charge pumping block 600A decreases. However, since the period pulse signals CLK and CLKB are driven by the higher voltage, the pumping operation may be performed more quickly. Therefore, although the number of charge pumping operations decreases, the voltage level of the internal voltage terminal N0 is maintained at the target voltage level.

In short, the pumping operation for increasing the voltage level of the internal voltage terminal N0 to the target level may be divided into two steps. First, when the level of the internal voltage terminal N0 is to be increased to the predetermined voltage level, the period pulse signals CLK and CLKB are driven by the first power supply voltage VDD1 to perform the charge pumping. Second, when the level of the internal voltage terminal N0 is to be increased to the target voltage level from the predetermined voltage level and then maintained to the target voltage level, the second power supply voltage VDD2 drives the period pulse signals CLK and CLKB to perform the charge pumping. When the internal voltage V_PUMP is generated by the above-described method, the number of charge pumping operations may decrease. Therefore, it may be possible to reduce the overall current consumption. While the voltage detection signal V_DET in this embodiment is a digital signal which can be distinguished through activation and deactivation, the voltage detection signal V_DET may indicate a state through a change in voltage level using an analog signal in another embodiment.

As described above, the internal voltage V_PUMP may be generated through two pumping steps. In the first pumping step, the first power supply voltage VDD1 and the ground voltage VSS drive the period pulse signals CLK and CLKB, which in turn control the charge pumping and thereby increase the voltage level of the internal voltage terminal N0 to the predetermined voltage level. In the second pumping step, the ground voltage VSS and the second power supply voltage VDD2 drive the period pulse signals CLK and CLKB, is which in turn control the charge pumping and thereby increase the voltage level of the internal voltage terminal N0 to the target voltage level from the predetermined voltage level and maintain the voltage after the first pumping step. The period pulse signals CLK and CLKB driven by the second power supply voltage VDD2 and the ground voltage VSS have a longer pulsing period than the period pulse signals CLK and CLKB driven by the first power supply voltage VDD1 and the ground voltage VSS.

Figure 3:
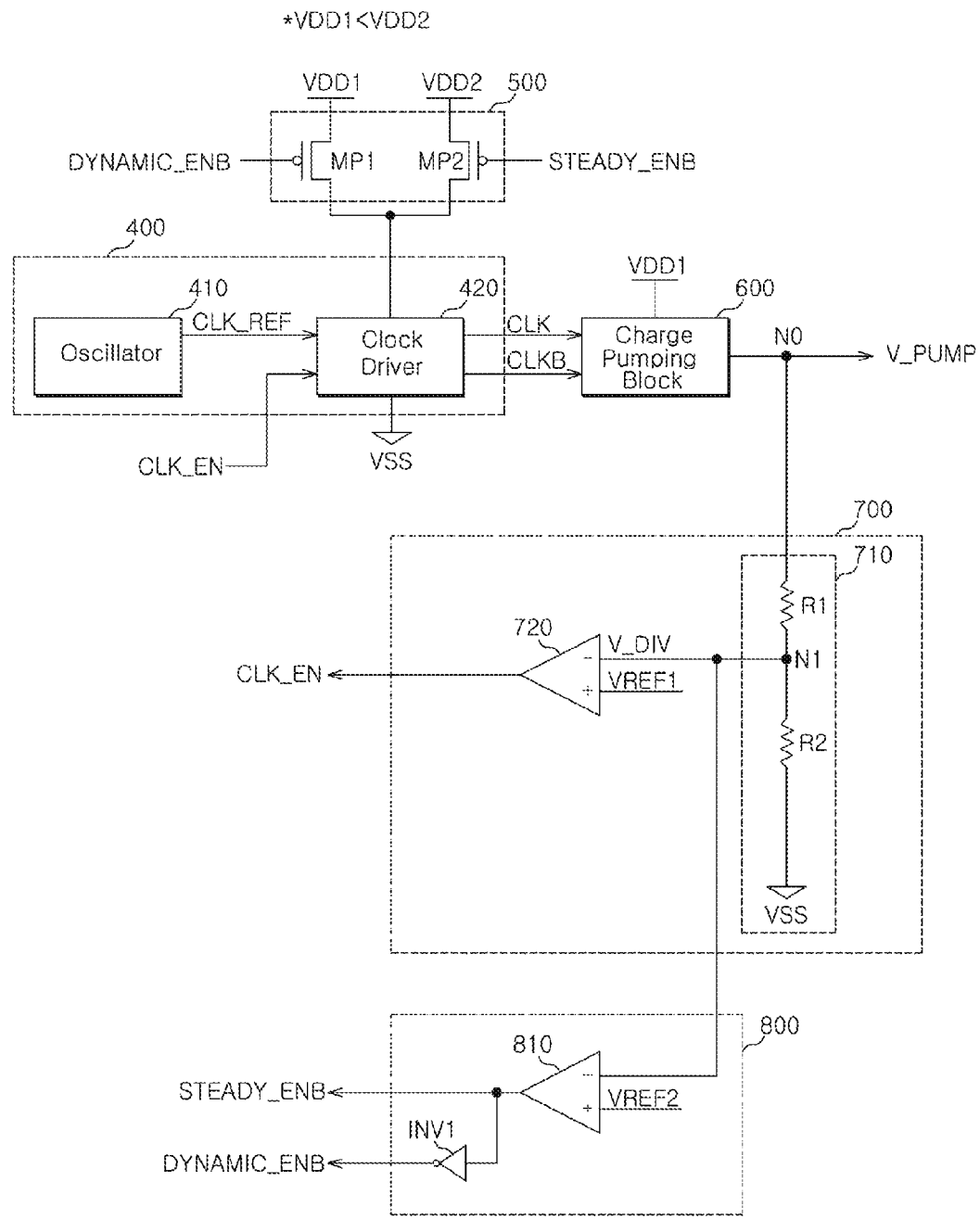
FIG. 3 is a configuration diagram of an internal voltage generator according to a more specific exemplary aspect of FIG. 2.

FIG. 3 is a configuration diagram of an internal voltage generator according to a more specific embodiment of FIG. 2.

In FIG. 3, the internal voltage generator according to this embodiment includes a charge pumping block 600, a period pulse generation block 400, a driving voltage supply block 500, a voltage detection block 700, and an interval signal generation block 800.

The detailed configuration and operation of the internal voltage generator will be described below.

A period pulse signal controls the charge pumping block 600 to perform charge pumping generate an internal voltage V_PUMP, and to output the generated internal voltage V_PUMP to an internal voltage terminal N0. The charge pumping block 600 generates the internal voltage V_PUMP using a first power supply voltage VDD1. The voltage of the generated internal voltage V_PUMP may be higher than that of the first power supply voltage VDD1.

In response to a clock output enable signal CLK_EN, the period pulse generation block 400 may drive period pulse signals CLK and CLKB. The period pulse generation block 400 includes an oscillator 410 and a clock driver 420. The oscillator 410 may be configured to output a clock signal CLK_REF having a predetermined period. The clock driver 420 is configured to drive the period pulse signals CLK and CLKB corresponding to the clock signal CLK_REF using a driving voltage supplied from the driving voltage supply block 500 when the clock output enable signal CLK_EN is activated. The period pulse signals CLK and CLKB may be differential clock signals.

When first interval signal DYNAMIC_ENB is activated, the driving voltage supply block 500 may be configured to supply the first power supply voltage VDD1 as a driving voltage to the period pulse generation block 400. When the second internal signal STEADY_ENB is activated, the driving voltage supply block 500 may be configured to supply a second power supply voltage VDD2 as a driving voltage to the period pulse generation block 400. The second power supply voltage VDD2 has a higher voltage level than the first power supply voltage VDD1. The driving voltage supply block 500 includes a first voltage supply unit MP1 and a second voltage supply unit MP2. The first interval signal DYNAMIC_ENB controls the first voltage supply unit MP1 to selectively supply the first power supply voltage VDD1 to the period pulse generation block 400, and the second interval signal STEADY_ENB controls the second voltage supply unit MP2 to selectively supply the second power supply voltage VDD2 to the period pulse generation block 400.

The voltage detection block 700 may be configured to activate and output the clock output enable signal CLK_EN when the voltage level of the internal voltage terminal N0 may be lower than a target voltage level. The voltage detection block 700 includes a voltage division unit 710 and a first comparison unit 720. The voltage division unit 710 divides the voltage of the internal voltage terminal N0. The voltage division unit 710 includes a plurality of voltage drop elements R1 and R2, which connect the internal voltage terminal N0 and the ground voltage terminal VSS. When the voltage drop elements R1 and R2 are divided, the voltage V_DIV is generated. The first comparison unit 720 compares the divided voltage V_DIV outputted from the voltage division unit 710 with a first reference voltage VREF1. The comparison unit 720 then selectively outputs the clock output enable signal CLK_EN.

During the first interval, the interval signal generation block 800 is configured to activate and output the first interval signal DYNAMIC_ENB when the voltage level of the internal voltage terminal N0 matches the target level. After the first interval, the interval signal generation block 800 activates and outputs the second interval signal STEADY_ENB to maintain to the target level. The interval signal generation block 800 includes a second comparison unit 730 and an inverter INV1. The second comparison unit 730 may be configured to compare the divided voltage V_DIV with a second reference voltage VREF2, which has a lower voltage than the first reference voltage VREF1. Depending on the comparison, the second comparison unit 730 may output either of the first and second interval signals DYNAMIC_ENB and STEADY_ENB. The first interval signal DYNAMIC_ENB and the second interval signal STEADY_ENB have an inverse relationship.

Since the first and second reference voltages VREF1 and VREF2 are voltages generated by a band gap reference circuit, they are constant regardless of a temperature change. Furthermore, the voltage level of the second reference voltage VREF2 may be controlled to discriminate the first and second intervals, and may utilize a voltage level at which power consumption can be minimized.

Figure 4:
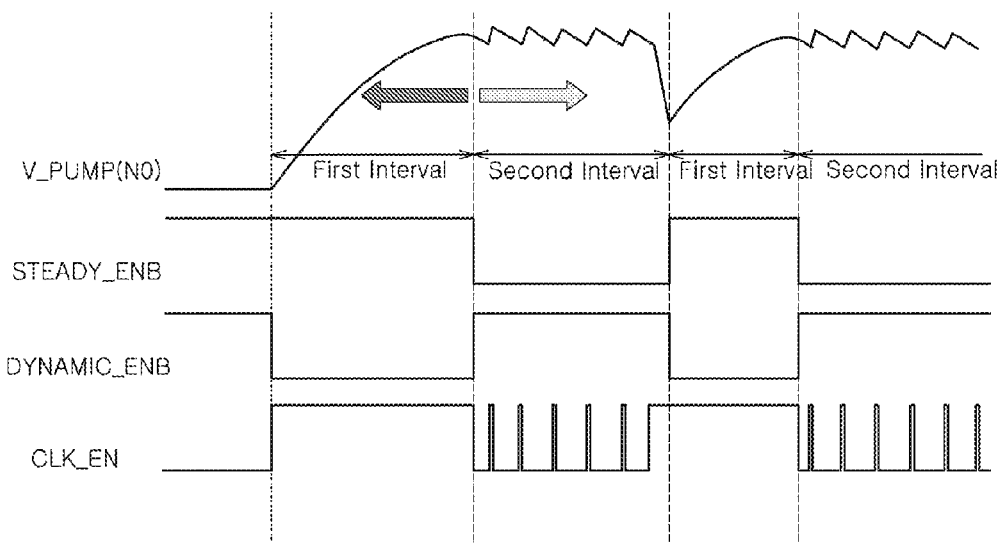
FIG. 4 is a diagram illustrating the internal operation of the internal voltage generator according to the exemplary aspect.

FIG. 4 is a diagram illustrating the internal operation of the internal voltage generator according to the embodiment.

In FIGS. 3 and 4, the internal operation of the internal voltage generator will be described as follows.

The pumping operation for increasing the voltage level of the internal voltage terminal N0 to the target level may be divided into two intervals. In the first interval, the voltage level of the internal voltage terminal N0 increases to the target level. While in the second interval, the voltage level of the internal voltage terminal N0 may be maintained at the target level after the first interval.

In the first interval, since the voltage level of the internal voltage terminal N0 may be lower than the target level, the clock output enable signal CLK_EN may be high. Therefore, the clock driver 420 drives the period pulse signals CLK and CLKB using the first power supply voltage VDD1 and the ground voltage VSS supplied from the first voltage supply unit MP1 as driving voltages. The is charge pumping block 600 also increases the voltage level of the internal voltage terminal N0 by performing charge pumping using the period pulse signals CLK and CLKB.

In the second interval, the voltage level of the internal voltage terminal N0 may momentarily drop below the target level, depending on the consumption amount of the interval voltage V_PUMP. Therefore, the clock output enable signal CLK_EN may be activated when the voltage level of the internal voltage terminal N0 momentarily drops below the second interval target level. The clock driver 420 drives the period pulse signals CLK and CLKB using the second power supply voltage VDD2 and the ground voltage VSS supplied from the second voltage supply unit MP2 as driving voltages. The charge pumping block 600 increases the voltage level of the internal voltage terminal N0 by performing charge pumping using the period pulse signals CLK and CLKB. In the second interval, the clock output enable signal CLK_EN is not activated at all times, but activated only when the voltage level of the internal voltage terminal N0 drops below the target level. Therefore, the charge pumping in the second interval is limited. When the internal voltage V_PUMP is generated by the above-described method, the number of charge pumping operations decreases. Therefore, it is possible to reduce the overall current consumption.

Figure 5:
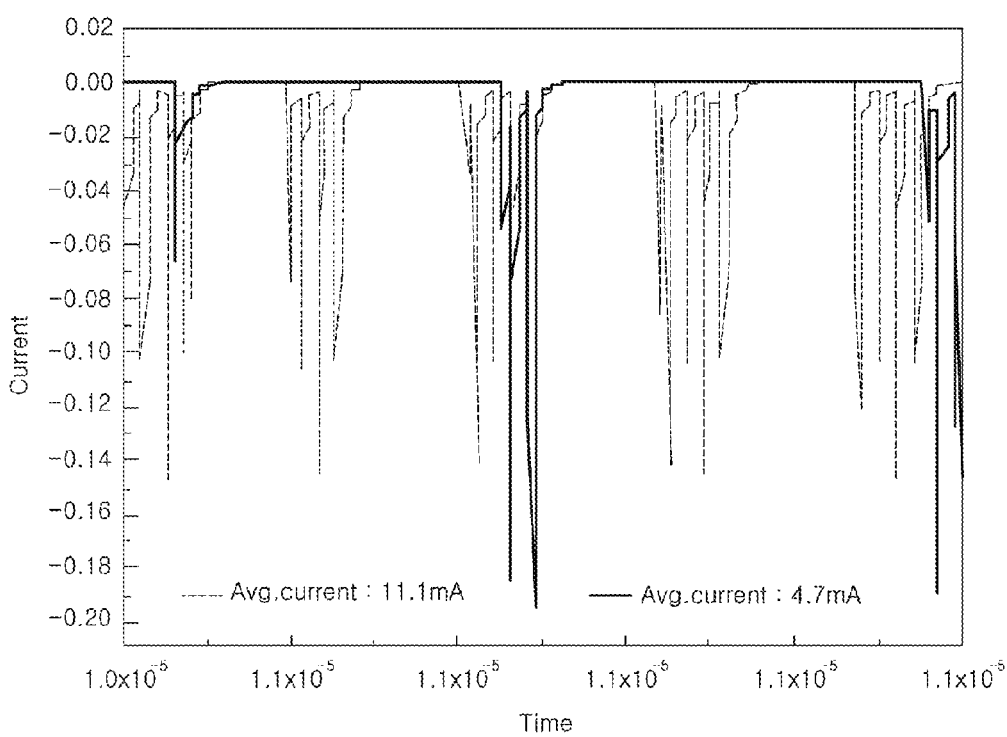
FIG. 5 is a diagram showing a result obtained by measuring the current consumption of the internal voltage generator according to the exemplary aspect.

FIG. 5 is a diagram showing a result obtained by measuring the current consumption of the internal voltage generator according to the embodiment.

In FIG. 5, a dotted line indicates the power consumption of the internal voltage generator driving the period pulse signals CLK and CLKB with the power supply voltage VDD and the ground voltage VSS. A solid line indicates the power consumption of the interval voltage generator driving the period pulse signals CLK and CLKB with the first power supply voltage VDD1 and the ground voltage VSS, or the second power supply voltage VDD2 and the ground voltage VSS, when the operation uses two intervals. The average current consumption of the interval voltage generator driving the period pulse signals CLK and CLKB by performing the charge pumping operation divided into the first and second intervals is 4.7 mA. On the other hand, the average current consumption of the internal voltage generator which drives the period pulse signals CLK and CLKB using only the power supply voltage VDD without dividing the intervals is 11.1 mA.

In addition, another exemplary aspect that describes the present invention in more detail is available. This exemplary aspect includes additional components that are unrelated to the technical idea of the present invention. Furthermore, an active high or active low configuration for indicating the activation state of a signal or circuit may differ depending on the embodiments. There may be many different exemplary aspects containing specific descriptions, depending on the modification of the exemplary aspects. Furthermore, since the modification can be easily inferred by those skilled in the art, the enumeration thereof will be omitted.

While certain embodiments have been described above, it will be understood to those skilled in the art that the embodiments described are by way of example only. Accordingly, the interval voltage generator and the method of generating an internal voltage described herein should not be limited based on the described embodiments. Rather, the interval voltage generator and the method of generating an internal voltage device described herein should only be limited in light of the claims that follow when taken in conjunction with the above description and accompanying drawings.

What is claimed is:

1. An internal voltage generator comprising:
a charge pumping block configured to perform charge pumping base on a period pulse signal to generate an internal voltage and output the generated internal voltage to an interval voltage terminal;
a voltage detection block configured to detect a voltage level of the internal voltage terminal;
a driving voltage supply block configured to supply one of a first power supply voltage and a second power supply voltage as a driving voltage based on a detection result of the voltage detection block, the second power supply voltage having a higher voltage level than the first power supply voltage; and
a period pulse generation block configured to drive the period is pulse signal using the driving voltage supplied from the driving voltage supply block,
wherein the period pulse signal driven by the second power supply voltage has a longer pulsing period than the period pulse signal driven by the first power supply voltage.

2. The internal voltage generator according to claim 1, wherein the voltage detection block detects whether or not the voltage level of the internal voltage terminal reaches a predetermined level which is lower than a target level of the internal voltage terminal.

3. The internal voltage generator according to claim 1, wherein the voltage detection block comprises:
a voltage division unit configured to divide a voltage on the internal voltage terminal; and
a comparison unit configured to compare the divided voltage outputted from the voltage division unit with a reference voltage.

4. The internal voltage generator according to claim 3, wherein the reference voltage is a voltage generated by a band gap reference circuit.

5. The internal voltage generator according to claim 1, wherein the period pulse signal comprises a differential clock signal.

6. A method of generating an internal voltage by performing charge pumping base on a period pulse signal, the method comprising:
performing charge pumping base on the period pulse signal which is driven by a first power supply voltage and a ground voltage during a first interval in which a voltage level of an internal voltage terminal increases to a predetermined voltage level; and
performing charge pumping base on the period pulse signal driven by a second power supply voltage having a higher level than the first power supply voltage and the ground voltage during a second interval in which the voltage level of the internal voltage terminal increases to a target voltage level from the predetermined voltage level and is then maintained to the target voltage level,
wherein the period pulse signal driven by the second power supply voltage and the ground voltage has a longer pulsing period than the period pulse signal driven by the first power supply voltage and the ground voltage.

7. An internal voltage generator comprising:
a charge pumping block configured to perform charge pumping base on a period pulse signal to generate an internal voltage, and output the generated internal voltage to an internal voltage terminal;
a period pulse generation block configured to drive the period pulse signal in response to a clock output enable signal;
a driving voltage supply block configured to supply a first power supply voltage as a driving voltage to the period pulse generation block during an activation interval of a first interval signal, and supply a second power supply voltage as a driving voltage to the period pulse generation block during an activation interval of a second interval signal, the second power supply voltage having a higher voltage level than the first power supply voltage;
a voltage detection block configured to activate and output the clock output enable signal when a voltage level of the internal voltage terminal is lower than a target voltage level; and
an interval signal generation block configured to activate and output the first interval signal during a first interval in which the voltage level of the internal voltage terminal increases to the target voltage level, and activate and output the second interval signal during a second interval in which the voltage level of the internal voltage terminal is maintained to the target voltage level, after the first interval.

8. The internal voltage generator according to claim 7, wherein the period pulse generation block comprises:
an oscillator configured to output a clock signal; and
a clock driver configured to drive the period pulse signal corresponding to the clock signal using the driving voltage supplied from the driving voltage supply block when the clock output enable signal is activated.

9. The internal voltage generator according to claim 7, wherein the driving voltage supply block comprises:
a first voltage supply unit configured to selectively supply the first power supply voltage to the period pulse generation block based on the first interval signal; and
a second voltage supply unit configured to selectively supply the second power supply voltage to the period pulse generation block based on the second interval signal.

10. The internal voltage generator according to claim 7, wherein the period pulse signal comprises a differential clock signal.

11. The internal voltage generator according to claim 7, wherein the voltage detection block comprises:
a voltage division unit configured to divide the voltage of the internal voltage terminal; and
a first comparison unit configured to compare the divided voltage outputted from the voltage division unit with a first reference voltage to output the clock output enable signal.

12. The internal voltage generator according to claim 11, wherein the interval signal generation block comprises a second comparison unit configured to compare the divided voltage with a second reference voltage having a lower voltage level than the first is reference voltage to output the first and second interval signals which have an inverted relation to each other.

13. The internal voltage generator according to claim 12, wherein the first and second reference voltages are voltages generated by a band gap reference circuit.

* * * * *